(12) United States Patent
Naito

(10) Patent No.: US 10,746,886 B2
(45) Date of Patent: Aug. 18, 2020

(54) RADIATION IMAGING APPARATUS, METHOD OF DRIVING THE SAME, AND RADIATION IMAGING SYSTEM

(71) Applicant: CANON KABUSHIKI KAISHA, Tokyo (JP)

(72) Inventor: Yuichi Naito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/115,649

(22) Filed: Aug. 29, 2018

(65) Prior Publication Data
US 2019/0072680 A1 Mar. 7, 2019

(30) Foreign Application Priority Data
Sep. 5, 2017 (JP) ................................. 2017-170604

(51) Int. Cl.
| | |
|---|---|
| *G01T 1/24* | (2006.01) |
| *H04N 5/32* | (2006.01) |
| *H04N 5/355* | (2011.01) |
| *H04N 5/347* | (2011.01) |
| *H04N 5/3745* | (2011.01) |
| *H04N 5/357* | (2011.01) |

(52) U.S. Cl.
CPC ............... *G01T 1/247* (2013.01); *H04N 5/32* (2013.01); *H04N 5/347* (2013.01); *H04N 5/3559* (2013.01); *H04N 5/3575* (2013.01); *H04N 5/37452* (2013.01)

(58) Field of Classification Search
CPC ......... G01T 1/247; G01T 1/2018; G01T 1/17; G01T 1/24; G01T 1/241; G01T 1/243; G01T 1/244; G01T 1/249; G01T 1/161; H04N 5/32; H04N 5/3205; H04N 5/347; H04N 5/3559; H04N 5/3575; H04N 5/37452
See application file for complete search history.

(56) References Cited

U.S. PATENT DOCUMENTS

| | | | |
|---|---|---|---|
| 6,690,493 B1* | 2/2004 | Kobayashi | ........... H04N 5/3454 348/307 |
| 9,001,972 B2* | 4/2015 | Takahashi | ................ H05G 1/30 378/62 |
| 9,482,628 B2 | 11/2016 | Naito et al. | |
| 9,526,470 B2* | 12/2016 | Nishino | ................ G01T 1/2006 |
| 9,606,246 B2 | 3/2017 | Naito | |
| 9,756,267 B2 | 9/2017 | Dowaki et al. | |

(Continued)

FOREIGN PATENT DOCUMENTS

| | | | |
|---|---|---|---|
| JP | 2012095201 A | * | 5/2012 |
| JP | 2014-030149 A | | 2/2014 |

*Primary Examiner* — Kiho Kim
(74) *Attorney, Agent, or Firm* — Venable LLP

(57) ABSTRACT

A radiation imaging apparatus, comprising a sensor array in which a plurality of sensors capable of detecting radiation are arrayed, and a readout unit configured to read out image data from the sensor array, wherein the sensor array has, as an operation mode, a binning mode in which signals of not less than two sensors are collectively output, and the readout unit includes a correcting unit configured to correct image data read out from the sensor array irradiated with radiation, based on image data read out in the binning mode from the sensor array not irradiated with radiation.

12 Claims, 9 Drawing Sheets

(56) References Cited

U.S. PATENT DOCUMENTS

| | | | | |
|---|---|---|---|---|
| 2005/0220270 A1* | 10/2005 | Kameshima | ............ | A61B 6/405 |
| | | | | 378/116 |
| 2008/0239115 A1* | 10/2008 | Sugizaki | .................. | H04N 5/32 |
| | | | | 348/246 |
| 2011/0147601 A1* | 6/2011 | Niekawa | .............. | A61B 6/4233 |
| | | | | 250/370.09 |
| 2012/0138811 A1* | 6/2012 | Takenaka | .................. | G01T 1/17 |
| | | | | 250/394 |
| 2013/0071000 A1* | 3/2013 | Takagi | ................. | A61B 6/4233 |
| | | | | 382/132 |
| 2013/0341525 A1* | 12/2013 | Maruta | ..................... | G01T 1/17 |
| | | | | 250/394 |
| 2015/0139390 A1* | 5/2015 | Bellazzini | ............... | G01T 1/247 |
| | | | | 378/62 |
| 2016/0015358 A1* | 1/2016 | Yagi | ......................... | H04N 5/32 |
| | | | | 378/62 |
| 2016/0084969 A1* | 3/2016 | Sato | ........................ | G01T 1/247 |
| | | | | 250/370.08 |
| 2016/0345920 A1* | 12/2016 | Tajima | ..................... | H04N 5/32 |

* cited by examiner

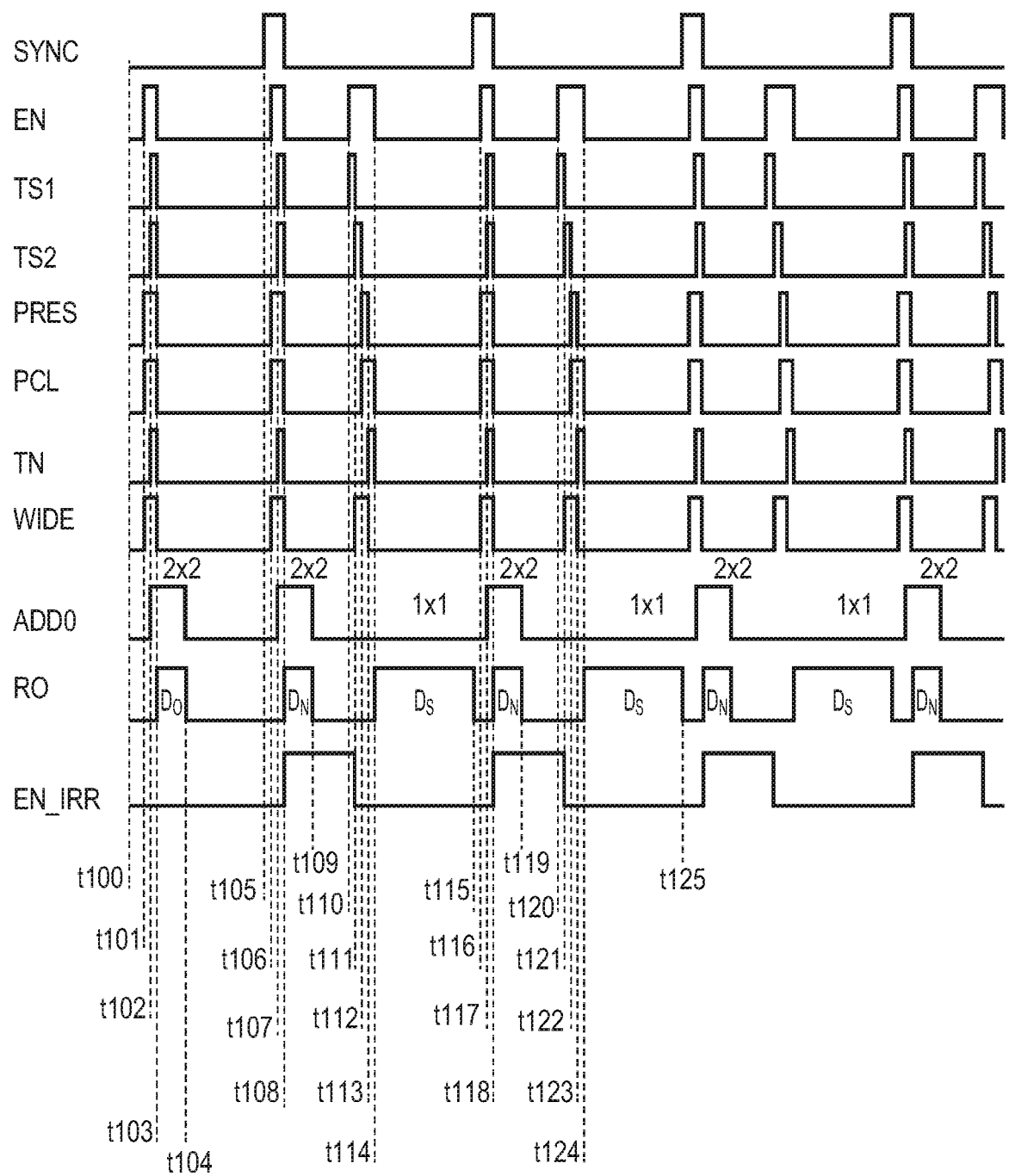

RADIATION IMAGING APPARATUS, METHOD OF DRIVING THE SAME, AND RADIATION IMAGING SYSTEM

BACKGROUND OF THE INVENTION

Field of the Invention

The present invention relates to a radiation imaging apparatus, a method of driving the same, and a radiation imaging system.

Description of the Related Art

There is a radiation imaging apparatus including a sensor array in which a plurality of sensors are arrayed, a driving unit for driving each sensor, a transfer unit for horizontally transferring a signal of each sensor, and a readout unit for reading out a group of the horizontally transferred signals as image data (see Japanese Patent Laid-Open No. 2014-030149). A user such as a doctor can observe a radiation image by outputting this image data to a display.

Generally, an output value variation (fluctuation) caused by 1/f noise (flicker noise) sometimes occurs in the readout unit, so shading having different degrees sometimes occurs on radiation images due to the imaging timings. This may deteriorate the quality of the radiation images.

The readout unit disclosed in Japanese Patent Laid-Open No. 2014-030149 includes a differential amplifier (for example, 141) which amplifies a signal of each sensor, a converter (for example, 151) which performs analog-to-digital conversion on the amplified signal, and an adder (for example, 431) which adds a signal corresponding to a reference voltage signal (Vref) to the signal of each sensor. According to Japanese Patent Laid-Open No. 2014-030149, the variation in output value of the readout unit is corrected by adding the signal corresponding to the reference voltage signal to the signal of each sensor, thereby improving the quality of a radiation image.

SUMMARY OF THE INVENTION

It is an object of the present invention to implement correction for further improving the quality of a radiation image with a relatively simple arrangement.

One of the aspects of the present invention provides a radiation imaging apparatus, comprising a sensor array in which a plurality of sensors capable of detecting radiation are arrayed, and a readout unit configured to read out image data from the sensor array, wherein the sensor array has, as an operation mode, a binning mode in which signals of not less than two sensors are collectively output, and the readout unit includes a correcting unit configured to correct image data read out from the sensor array irradiated with radiation, based on image data read out in the binning mode from the sensor array not irradiated with radiation.

Further features of the present invention will become apparent from the following description of exemplary embodiments with reference to the attached drawings.

BRIEF DESCRIPTION OF THE DRAWINGS

FIG. 6 is a timing chart for explaining a method of driving the radiation imaging apparatus;

DESCRIPTION OF THE EMBODIMENTS

Figure 1:
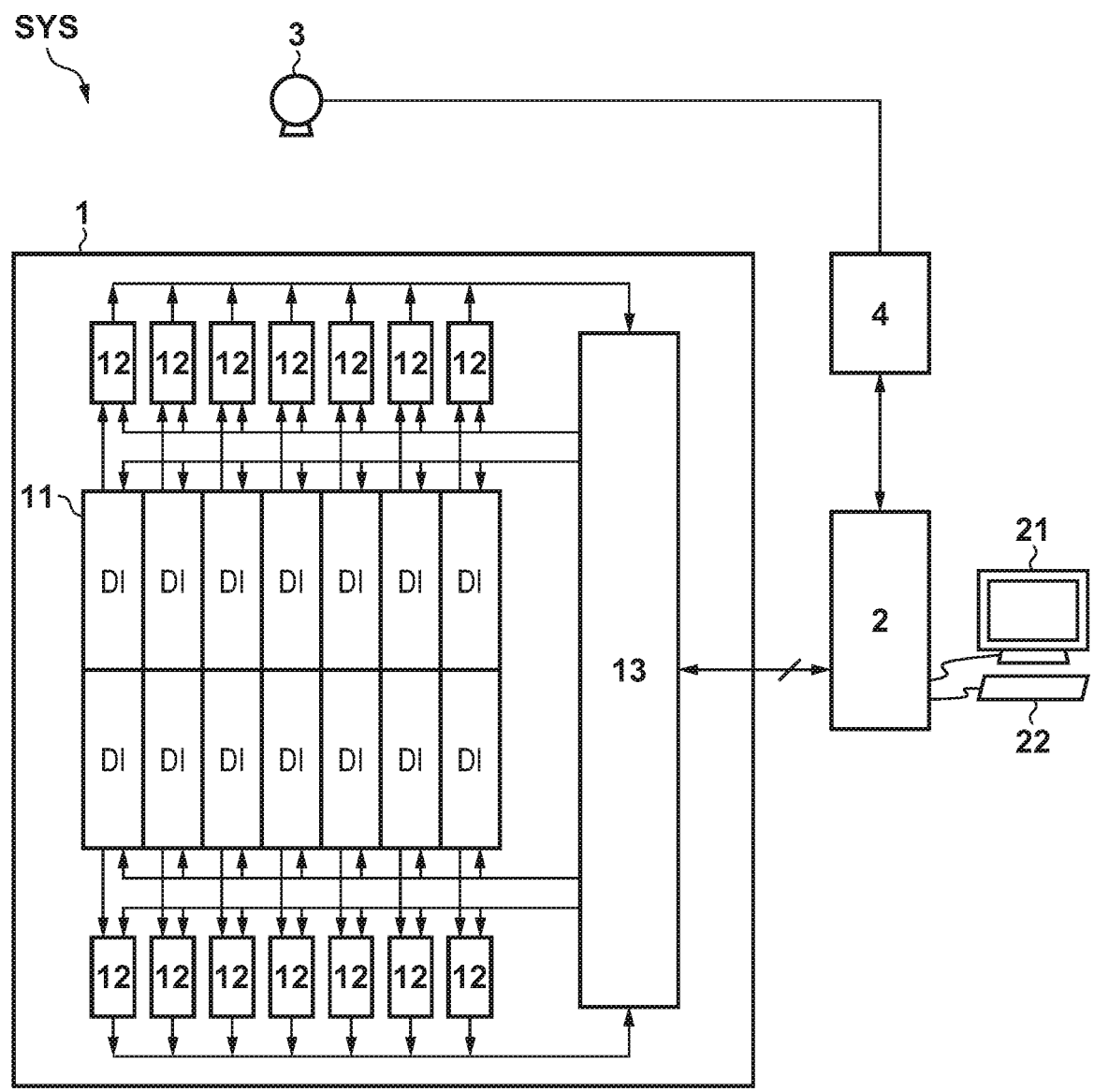
FIG. 1 is a view for explaining a configuration example of a radiation imaging system.

Preferred embodiments of the present invention will be explained below with reference to the accompanying drawings. Note that each drawing is merely a schematic view drawn to exemplify a structure or arrangement, so the dimensions of each member shown in the drawing do not necessarily reflect the actual dimensions. Note also that the same reference numerals in these drawings denote the same members or the same constituent elements, and an explanation of the same contents will be omitted.

First Embodiment

FIG. 1 is a system block diagram showing the configuration of a radiation imaging system SYS according to the first embodiment. The radiation imaging system SYS includes a radiation imaging apparatus 1, a calculation unit 2, a radiation source 3, and a radiation source control unit 4. The radiation imaging apparatus 1 includes an imaging unit 11, readout units 12, and a processing unit 13. With this arrangement, the radiation imaging apparatus 1 generates image data by detecting radiation from the radiation source 3, and outputs this image data to the calculation unit 2.

The calculation unit 2 is, for example, a general-purpose computer including a CPU (Central Processing Unit) and memory, and connected to a display unit 21 such as a liquid crystal display and an input terminal 22 such as a keyboard. The calculation unit 2 outputs the image data received from the radiation imaging apparatus 1 to the display unit 21, and causes the display unit 21 to display a radiation image based on this image data. A user such as a doctor can input information (to be referred to as "input information" hereinafter), which is necessary to perform imaging, to the calculation unit 2 by using the input terminal 22. The input information contains, for example, information of a subject such as a patient, information indicating a portion (tissue) to be observed or examined, information indicating an imaging mode such as a still image or moving image, and related information of these pieces of information.

The radiation imaging apparatus 1 and calculation unit 2 are connected to each other so as to be communicable to each other, and can exchange various control signals. Based on the input information from the input terminal 22, the radiation imaging apparatus 1 receives a signal indicating the start of imaging, a signal indicating information necessary for the imaging, and the like from the calculation unit 2. Also, the radiation imaging apparatus 1 outputs, for example, a signal indicating the completion of imaging preparations of the apparatus 1, a signal indicating a request for the start of irradiation, and a signal indicating a request for the termination of irradiation, to the calculation unit 2.

The radiation source 3 generates radiation (X-ray is typically used, but another electromagnetic wave such as α-ray may also be used). This radiation passes through a subject (not shown) and enters the imaging unit 11 of the radiation imaging apparatus 1. Upon receiving the signal indicating a request for the start of irradiation from the radiation imaging apparatus 1, the calculation unit 2 causes the radiation source control unit 4 to drive the radiation source 3. Note that the radiation source control unit 4 can be a part of the calculation unit 2, and can also be incorporated into the radiation source 3.

In the radiation imaging apparatus 1, the imaging unit 11 is configured by arraying a plurality of semiconductor chips DI. In this embodiment, 2 rows×7 columns of semiconductor chips DI are arrayed as an example. However, the present invention is not limited to this array form. As will be described in detail later, each semiconductor chip DI is an image sensor chip including a photoelectric conversion element (for example, a CMOS image sensor). Although not shown, the plurality of semiconductor chips DI are arrayed on a substrate or the like, and a scintillator is extended on the substrate so as to cover the plurality of semiconductor chips DI.

The plurality of readout units 12 correspond to the plurality of semiconductor chips DI, and each readout unit 12 can generate image data based on a group of signals from the corresponding semiconductor chip DI. The processing unit 13 receives a plurality of image data from the plurality of readout units 12, combines the plurality of image data into single image data, and outputs the image data to the calculation unit 2. When performing imaging, the processing unit 13 also functions as a controller for controlling the imaging unit 11 and readout units 12.

In this embodiment, the processing unit 13 is configured by an ASIC (Application Specific Integrated Circuit). However, the function of the processing unit 13 may also be implemented by another semiconductor integrated circuit such as a PLD (Programmable Logic Device). Alternatively, the function of the processing unit 13 can be implemented by a CPU and memory. That is, the function of the processing unit 13 explained in this specification can be implemented by either hardware or software. This similarly applies to the calculation unit 2.

Note that the configuration of the radiation imaging system SYS is not limited to the above example, and a part of the function of each unit may also be implemented by another unit. For example, a part of the function of the processing unit 13 may also be implemented by the calculation unit 2, and a part of the function of the readout unit 12 may also be implemented by the processing unit 13. Note also that another unit can incidentally be added to the above-described configuration as needed.

Figure 2:
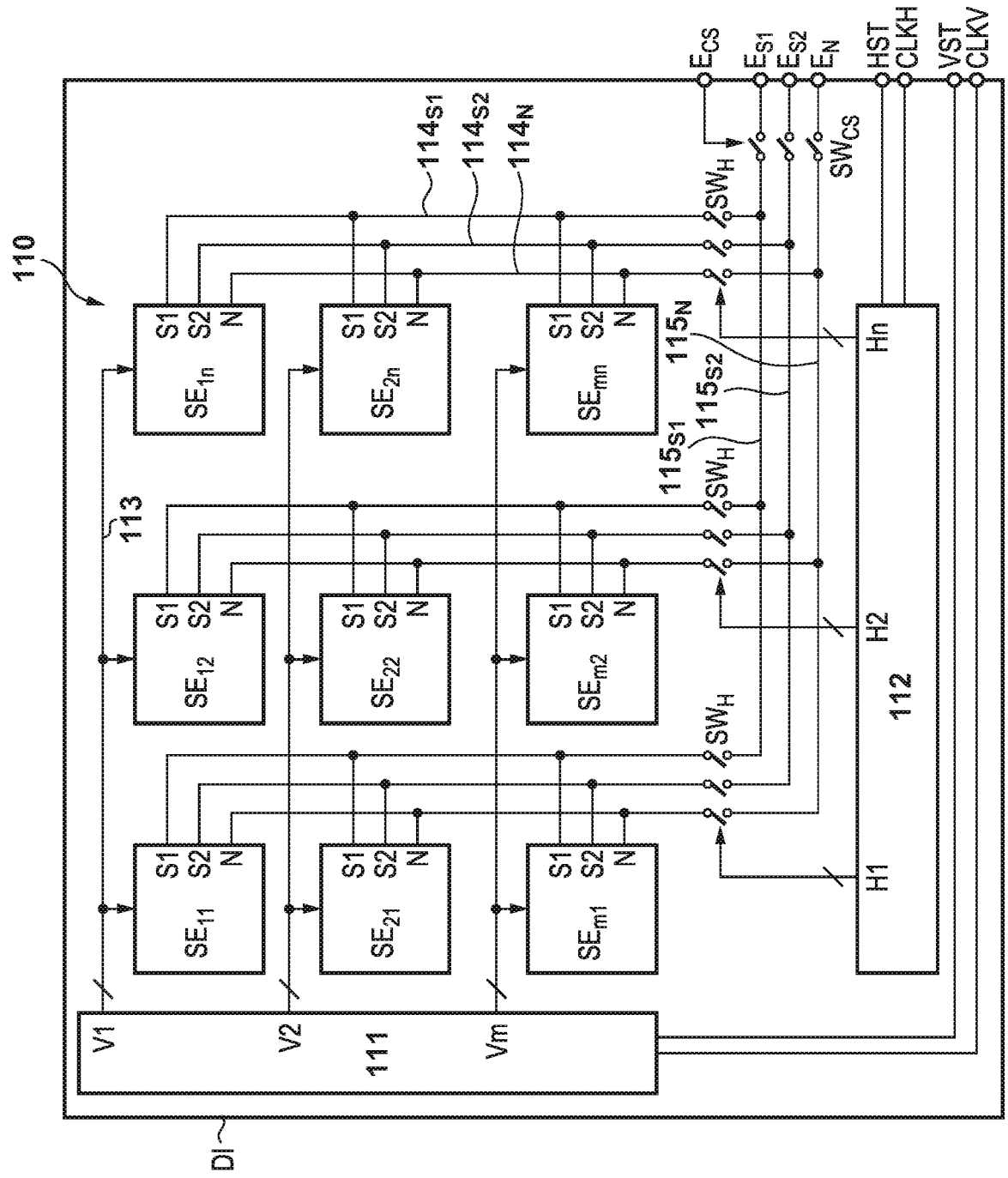
FIG. 2 is a view for explaining a configuration example of a single semiconductor chip forming an imaging unit of a radiation imaging apparatus.

FIG. 2 is a block diagram showing the arrangement of a single semiconductor chip DI. The semiconductor chip DI includes a sensor array 110, a driving unit 111, and a transfer unit 112. The sensor array 110 includes a plurality of sensors SE arranged to form an array shape (that is, form a plurality of rows and a plurality of columns). In this embodiment, the sensor array 110 is formed by m rows×n columns. To distinguish between these sensors, a sensor SE positioned in the ith row and jth column is indicated by "$SE_{ij}$" (i is an arbitrary integer from 1 to m, and j is an arbitrary integer from 1 to n). For example, a sensor SE positioned in the first row and second column is indicated by "$SE_{12}$". Note that when it is unnecessary to distinguish between these sensors, they are simply expressed as "sensors SE".

The driving unit 111 drives the plurality of sensors SE in the sensor array 110 row by row. In this embodiment, one or more signal lines 113 are arranged for each row of the sensor array 110. The driving unit 111 drives the sensors SE of each row by supplying various driving signals to these sensors through the corresponding signal lines 113. The driving unit 111 can scan the first to mth rows or can sequentially select these rows, and can also be called a vertical scanning circuit, a row selecting circuit, or the like. The driving unit 111 can be configured by using, for example, a shift register or decoder. As will be described in detail later, the driving unit 111 receives a start pulse signal VST and a clock signal CLKV, and selects a row based on these signals (note that FIG. 2 shows V1 to Vm corresponding to the first to mth rows).

As will be described in detail later, each sensor SE driven by the driving unit 111 outputs S1, S2, and N signals. Column signal lines $114_{S1}$, $114_{S2}$, and $114_N$ are arranged for each column of the sensor array 110, and the S1, S2, and N signals are respectively output through the column signal lines $114_{S1}$, $114_{S2}$, and $114_N$.

The column signal lines $114_{S1}$, $114_{S2}$, and $114_N$ are respectively connected to output lines $115_{S1}$, $115_{S2}$, and $115_N$ via switches $SW_H$. The switches $SW_H$ are turned on/off based on control signals from the transfer unit 112. Consequently, the S1, S2, and N signals of the first to nth columns are sequentially transferred column by column (horizontal transfer) through the output lines $115_{S1}$, $11_{S2}$, and $115_N$. The transfer unit 112 can scan the first to nth columns or can sequentially select these columns, and can also be called a horizontal scanning circuit, column selecting circuit, or the like. As will be described in detail later, the transfer unit 112 receives a start pulse signal HST and clock signal CLKH, and selects a column based on these signals (note that FIG. 2 shows H1 to Hn corresponding to the first to nth columns).

The output lines $115_{S1}$, $115_{S2}$, and $115_N$ are respectively connected to terminals $E_{S1}$, $E_{S2}$, and $E_N$ via switches $SW_{CS}$. The switches $SW_{CS}$ are turned on/off based on control signals received by a terminal $E_{CS}$. Consequently, the S1, S2, and N signals propagating through the output lines $115_{S1}$, $115_{S2}$, and $115_N$ are output outside the semiconductor chip DI via the terminals $E_{S1}$, $E_{S2}$, and $E_N$, respectively.

Figure 3:
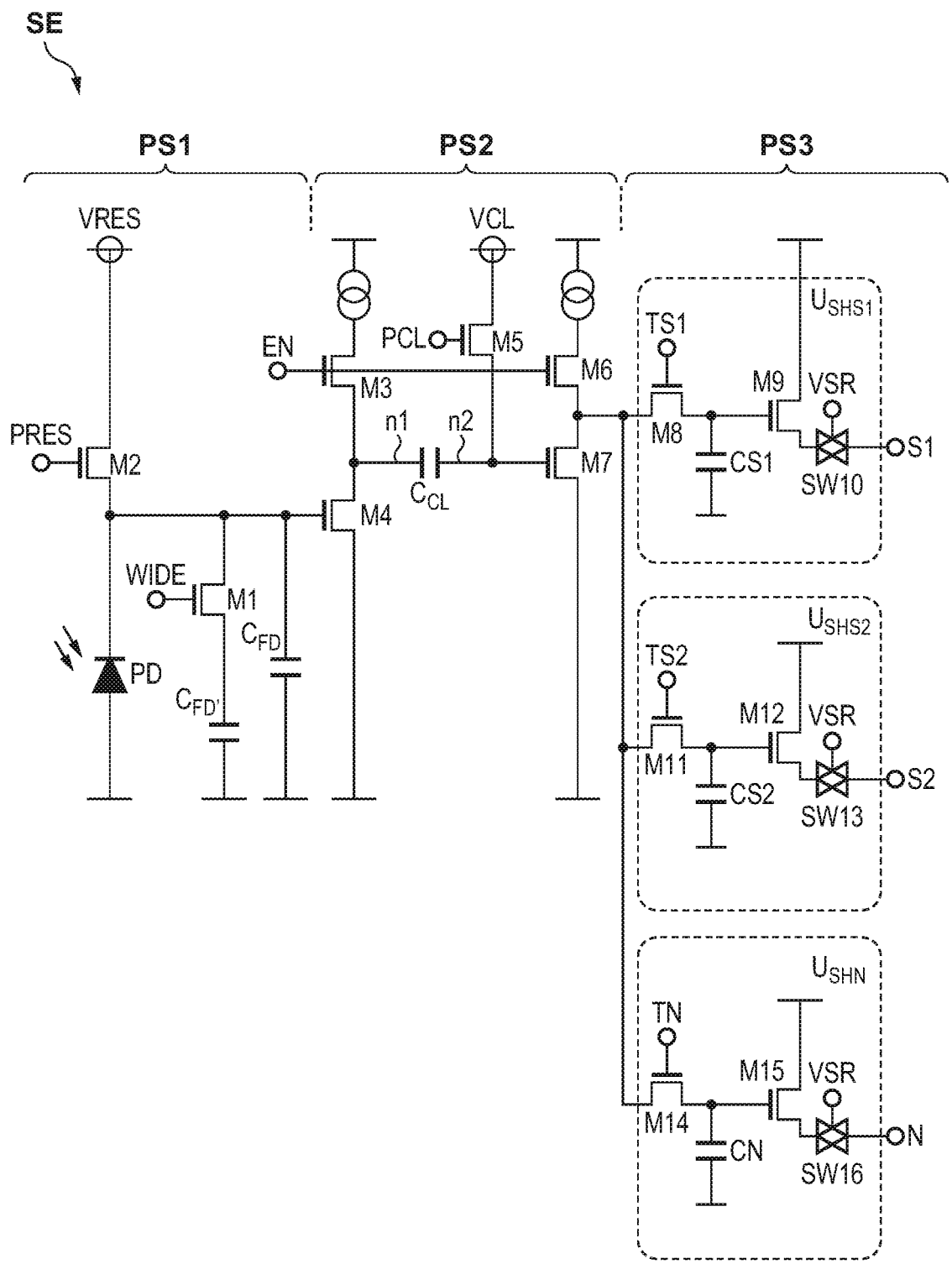
FIG. 3 is a view for explaining configuration example of a single sensor.

FIG. 3 is a circuit diagram showing the arrangement of a single sensor SE. The sensor SE is roughly divided into three portions PS1 to PS3. The first portion PS1 mainly acts as a detecting unit for detecting radiation. The second portion PS2 mainly acts as an amplifying unit for amplifying a signal corresponding to the detection result. The third portion PS3 mainly acts as a sampling unit for sampling the amplified signal.

The first portion PS1 includes a photoelectric converter PD, MOS transistors M1 and M2, and capacitors $C_{FD}$ and $C_{FD}'$. In this embodiment, a photodiode is used as the photoelectric converter PD. The anode is fixed to the ground voltage, and the cathode is connected to the capacitor $C_{FD}$ and also connected to the capacitor $C_{FD}'$ via the transistor M1. The transistor M2 is connected between the cathode and a power supply voltage VRES. With this arrangement, the first portion PS1 can detect radiation in each of two sensitivity modes (a high-sensitivity mode and a low-sensitivity mode (dynamic range mode)).

In this embodiment, light corresponding to radiation enters the photoelectric converter PD, and the photoelectric converter PD generates electric charge corresponding to the light. The generated electric charge is transferred to the capacitor $C_{FD}$ when the transistor M1 is OFF, and transferred to both the capacitors $C_{FD}$ and $C_{FD}'$ when the transistor M1 is ON. The transistor M1 is controlled by a control signal WIDE: the transistor M1 is turned on when the control signal WIDE is at H level (High level), and turned off when the control signal WIDE is at L level (Low level). A state in which the transistor M1 is OFF corresponds to the high-sensitivity mode, and the voltage of the capacitor $C_{FD}$ changes in accordance with the amount of electric charge generated in the photoelectric converter PD. A state in which the transistor M1 is ON corresponds to the low-sensitivity mode, and the capacitors $C_{FD}$ and $C_{FD}'$ are connected in parallel. Therefore, the voltages of both the two capacitors change in accordance with the amount of electric charge generated in the photoelectric converter PD.

The transistor M2 resets (or initializes) the photoelectric converter PD and (the voltages of) the capacitors $C_{FD}$ and $C_{FD}'$ based on a control signal PRES. Note that the capacitor $C_{FD}'$ is reset when the transistor M1 is ON.

The second portion PS2 includes MOS transistors M3 to M7 and a capacitor $C_{CL}$. The transistors M3 and M4 and a current source element are connected in series between the power supply voltage and ground voltage, and the gate of the transistor M4 is connected to the photoelectric converter PD of the first portion PS1 (connected to the cathode of the photodiode). The capacitor $C_{CL}$ is placed between a node n1 between the transistors M3 and M4 and another node n2. The transistor M5 is placed between a power supply voltage VCL and the node n2. The transistors M6 and M7 and a current source element are connected in series between the power supply voltage and ground voltage, and the gate of the transistor M7 is connected to the node n2.

The transistors M3 and M6 are turned on/off based on a control signal EN. When the transistor M3 is turned on, the transistor M4 shows an amplifying operation of amplifying a signal received by the gate. Likewise, when the transistor M6 is turned on, the transistor M7 shows an amplifying action of amplifying a signal received by the gate. The transistor M5 is turned on/off based on a control signal PCL. When the transistor M5 is turned on, (the voltage of) the node n2 is reset.

When the transistors M2, M3, M5, and M6 are ON, the capacitor $C_{CL}$ generates a predetermined voltage caused by the circuit configuration. When the transistor M5 is turned off from this state, the capacitor $C_{CL}$ is clamped to that voltage. When the transistor M2 is turned off after that, the transistor M4 transmits a voltage corresponding to the voltage received from the first portion PS1 to the node n1. This voltage change at the node n1 is transmitted to the node n2 via the capacitor $C_{CL}$, and the transistor M7 outputs a voltage corresponding to the voltage of the node n2 to the third portion PS3 on the rear stage. With this arrangement, the second portion PS2 amplifies the signal from the first portion PS1 and outputs the amplified signal to the third portion PS3.

In this embodiment, the third portion PS3 includes three sampling units $U_{SHS1}$, $U_{SHS2}$, and $U_{SHN}$. The sampling unit $U_{SHS1}$ includes transistors M8 and M9, a capacitor CS1, and a switch SW10. The transistors M8 and capacitor CS1 form a sample and hold circuit, and can sample the voltage received from the second portion PS2. This sampling can be implemented by switching ON/OFF of the transistor M8 based on a control signal TS1. The switch SW10 is turned on/off based on a control signal VSR. The transistor M9 performs a source follower operation by receiving the voltage of the capacitor CS1 by the gate, and outputs, via the switch SW10, a voltage corresponding to the voltage of the capacitor CS1 as "the S1 signal" to the above-described column signal line $114_{S1}$ (see FIG. 2).

Each of the sampling units $U_{SHS2}$ and $U_{SHN}$ has the same arrangement as that of the abovementioned sampling unit $U_{SHS1}$. That is, the sampling unit $U_{SHS2}$ includes transistors M11 and M12, a capacitor CS2, and a switch SW13 which respectively perform the same operations as those of the transistors M8 and M9, capacitor CS1, and switch SW10. The transistor M1*l* is turned on/off based on a control signal TS2. The transistor M12 outputs a voltage corresponding to the voltage of the capacitor CS2 as "the S2 signal" to the column signal line $114_{S2}$.

Similarly, the sampling unit $U_{SHN}$ includes transistors M14 and M15, a capacitor CN, and a switch SW16 which respectively perform the same operations as those of the transistors M8 and M9, capacitor CS1, and switch SW10. The transistor M14 is turned on/off based on a control signal TN. The transistor M15 outputs a voltage corresponding to the voltage of the capacitor CN as "the N signal" to the column signal line $114_N$.

In this embodiment having this configuration, the sampling unit $U_{SHS1}$ samples a signal from the second portion PS2 in the high-sensitivity mode as the S1 signal. The sampling unit $U_{SHS2}$ samples a signal from the second portion PS2 in the low-sensitivity mode as the S2 signal. The sampling unit $U_{SHN}$ samples an output signal from the second portion PS2 when the control signal PCL is turned on (that is, an output signal from the second portion PS2 which is reset) as the N signal. Note that the high-sensitivity mode/low-sensitivity mode may also be called a first-sensitivity mode/second-sensitivity mode or the like.

In this embodiment, the transistor M1 and the like explained above are NMOS transistors. In another embodiment, however, it is also possible to use PMOS transistors or transistors having another structure as some/all of these transistors.

In this embodiment, the sensor array 110 in which the above-described sensors SE are arrayed has "a binning mode" capable of collectively outputting signals of the sensors SE as an operation mode. For example, a switch is placed between two sensors SE adjacent to each other, so the S1 signal of one sensor SE and the S1 signal of the other sensor SE can be collected (summed or averaged) and output as one signal. Likewise, the S2 signal of one sensor SE and the S2 signal of the other sensor SE can collectively be output as one signal, and the N signal of one sensor SE and the N signal of the other sensor SE can collectively be output as one signal.

Figure 4A:
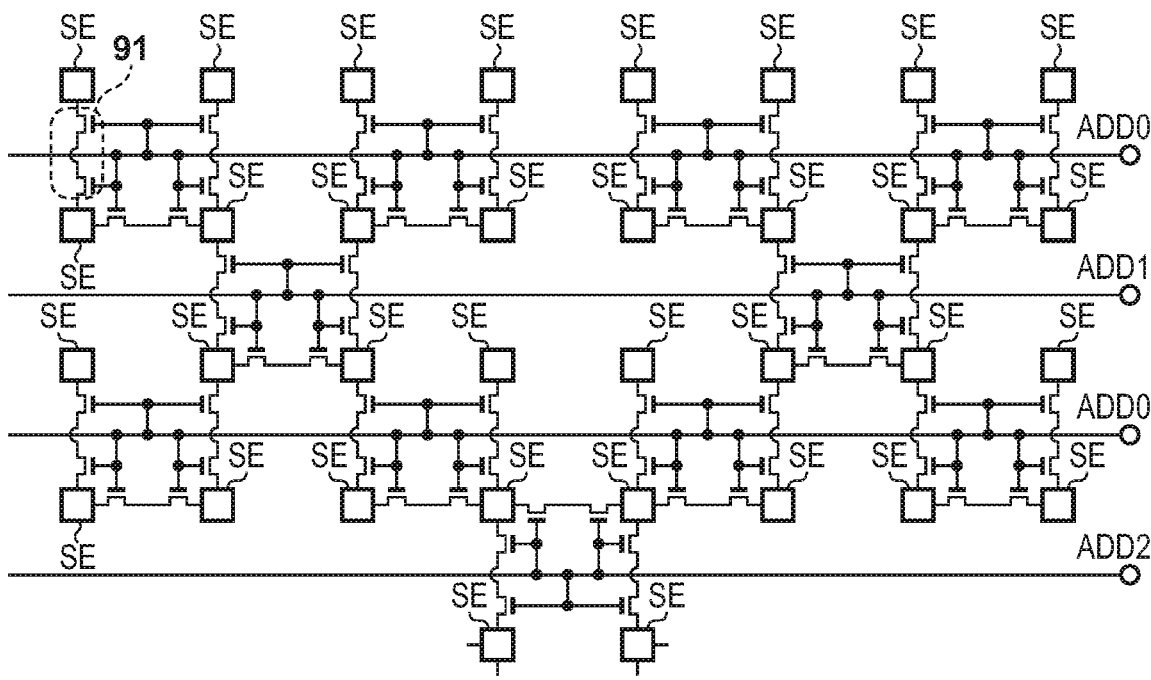
FIGS. 4A and 4B are views for explaining a configuration example for implementing a binning mode.

FIG. 4A is a view showing an example of the arrangement of the sensor array 110 for implementing the abovementioned binning mode. In this embodiment, the plurality of sensors SE are connected to each other by switches so that the S1 signals, S2 signals, and N signals of every four sensors in 2 rows×2 columns can independently be summed. For example, as shown in FIG. 4A, two sensors SE adjacent to each other in the column direction are connected by a connecting portion 91 including transistors as switches.

Figure 4B:
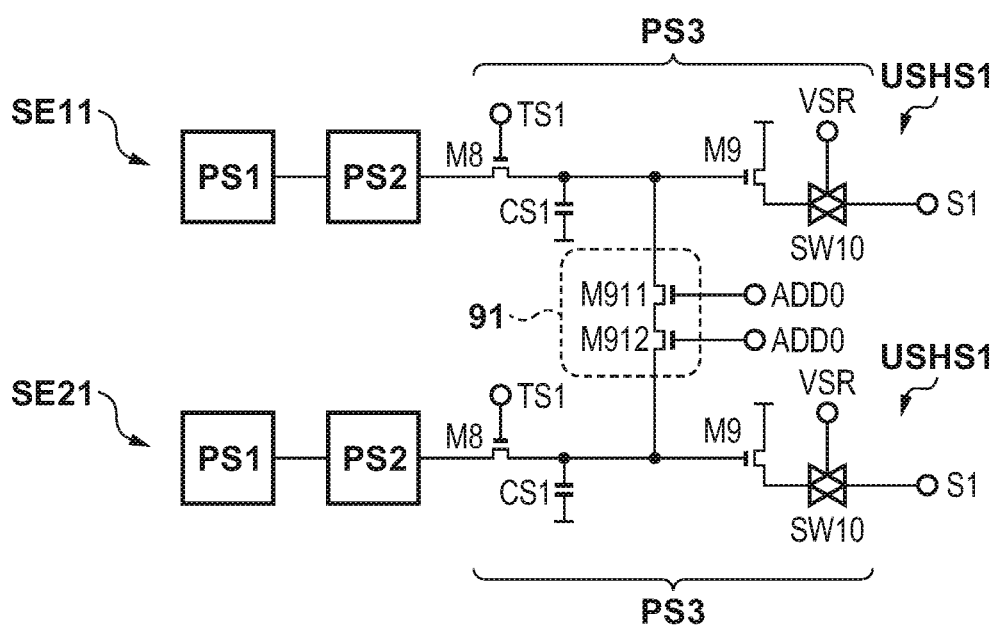

FIG. 4B is a view for explaining the arrangement of the connecting portion 91. In this embodiment, the connecting portion 91 between sensors $SE_{11}$ and $SE_{21}$ will be explained as an example. The connecting portion 91 connects the sampling unit $U_{SHS1}$ of the third portion PS3 in the sensor $SE_{11}$ and the sampling unit $U_{SHS1}$ of the third portion PS3 in the sensor $SE_{21}$. More specifically, the connecting portion 91 connects the capacitor CS1 of the sensor $SE_{11}$ and the capacitor CS1 of the sensor $SE_{21}$. The connecting portion 91 includes transistors M911 and M912. When these transistors are turned on, the S1 signal of the sensor $SE_{11}$ and the S1 signal of the sensor $SE_{21}$ can be collected into one signal. The transistors M911 and M912 can be turned on/off based on a control signal ADD0.

For the sake of visual simplicity, FIG. 4A shows the connecting portion 91 connecting the two sampling units $U_{SHS1}$ of the sensors $SE_{11}$ and $SE_{21}$. However, the connecting portion 91 is similarly arranged for each of the sampling units $U_{SHS2}$ and $U_{SHN}$. This makes it possible to collect the S2 signals of the sensors $SE_{11}$ and $SE_{21}$ into one signal, and collect the N signals of the sensors $SE_{11}$ and $SE_{21}$ into one signal.

Referring to FIG. 4A again, the plurality of sensors SE are further connected by the connecting portion 91 which is controlled by a control signal ADD1 so that the sensor signals (each set of the S1 signals, S2 signals, and N signals) can be collected for every 16 sensors in 4 rows×4 columns, and further connected by the connecting portion 91 which is controlled by a control signal ADD2 so that the sensor signals can be collected for every 64 sensors in 8 rows×8 columns.

The above-described arrangement makes it possible to implement the abovementioned binning mode, and equivalently output the sensor signals of all the sensors SE within a relatively short time. On the other hand, an operation mode of individually reading out the sensor signals from the plurality of sensors SE is called "a normal mode" in this specification.

For example, when reading out the sensor signals in the normal mode (when individually reading out the sensor signals from the plurality of sensors SE), all the control signals ADD0 to ADD2 are set at L level. For example, in the binning mode of collectively reading out the sensor signals for every four sensors in 2 rows×2 columns, the control signal ADD0 is set at H level, and the control signals ADD1 and ADD2 are set at L level. For example, in the binning mode of collectively reading out the sensor signals for every 16 sensors in 4 rows×4 columns, the control signals ADD0 and ADD1 are set at H level, and the control signal ADD2 is set at L level. For example, in the binning mode of collectively reading out the sensor signals for every 64 sensors in 8 rows×8 columns, all the control signals ADD0, ADD1, and ADD2 are set at H level.

Figure 5:
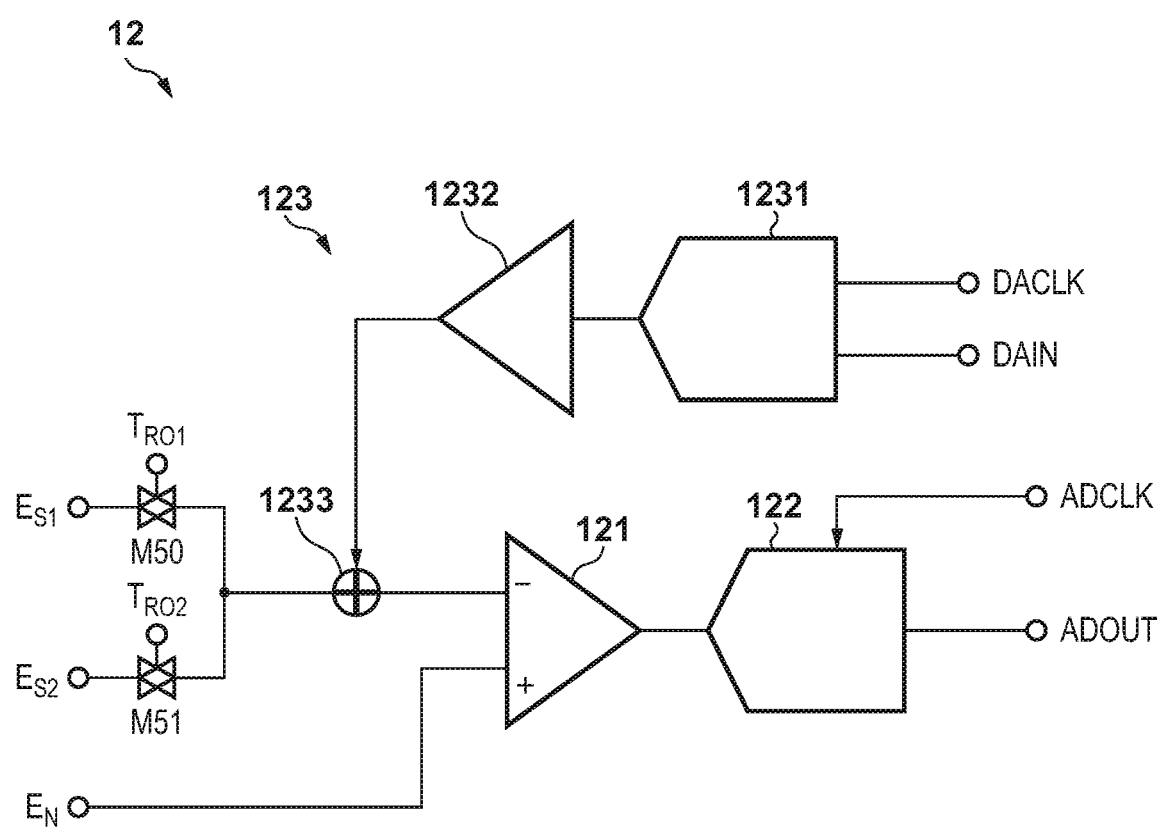
FIG. 5 is a view for explaining a configuration example of a readout unit.

FIG. 5 is a view showing the arrangement of the readout unit 12. The readout unit 12 includes a differential amplifier 121, a converter 122, and a corrector 123. The differential amplifier 121 includes an inverting input terminal (an input terminal indicated by "−" in FIG. 5), and a non-inverting input terminal (an input terminal indicated by "+" in FIG. 5), and can amplify the difference between two signal values received by these input terminals.

In this embodiment, the S1 signal output from a terminal $E_{S1}$ of the semiconductor chip DI via a switch M50, or the S2 signal output from a terminal $E_{S2}$ of the semiconductor chip DI via a switch M51, is input to the inverting input terminal of the differential amplifier 121. That is, the S1 and S2 signals are selectively input to the inverting input terminal of the differential amplifier 121. The switches M50 and M51 are turned on/off based on control signals $T_{RO1}$ and $T_{RO2}$. Also, the N signal output from a terminal $E_N$ of the semiconductor chip DI is input to the non-inverting input terminal of the differential amplifier 121.

In this arrangement, when the switch M50 is ON and the switch M51 is OFF, a signal corresponding to the difference between the S1 signal and N signal is output, and this removes a noise component (a component equivalent to the N signal) caused by the configuration of the sensor SE from the S1 signal. Also, when the switch M50 is OFF and the switch M51 is ON, a signal corresponding to the difference between the S2 signal and N signal is output, and this removes the abovementioned noise component caused by the configuration of the sensor SE from the S2 signal.

In this embodiment, the converter 122 is an analog-to-digital converter which performs analog-to-digital conversion (AD conversion) on the output signal from the differential amplifier 121 based on a clock signal ADCLK. The converter 122 outputs the AD-converted signal from a terminal ADOUT to the above-described processing unit 13 (see FIG. 1). Note that the converter 122 may also have a function of performing conversion for data transfer, for example, serial-to-parallel conversion.

The corrector 123 includes a converter 1231, an amplifier 1232, and an adder 1233. In this embodiment, the converter 1231 is a digital-to-analog converter which performs, based on a clock signal DACLK, digital-to-analog conversion (DA conversion) on a digital signal received by a terminal DAIN from the processing unit 13. The amplifier 1232 amplifies the DA-converted signal. The adder 1233 can add the signal from the amplifier 1232 to a signal to be input to the inverting input terminal of the differential amplifier 121. In this arrangement, as will be described in detail later, the above-described S1 signal or S2 signal to be input to the inverting input terminal of the differential amplifier 121 can be corrected by the corrector 123 when input to the differential amplifier 121.

FIG. 6 is a timing chart showing a method of driving the radiation imaging apparatus 1. The abscissa of FIG. 6 is the time axis. The ordinate shows a synchronization signal ("SYNC"), various control signals (the control signals EN, TS1, TS2, PRES, PCL, TN, and WIDE (see FIG. 3)), the control signal ADD0 (see FIGS. 4A and 4B), a state signal ("RO") indicating the state of the readout operation, and a radiation request signal ("EN_IRR") indicating a request for irradiation. FIG. 6 shows the signal levels (signal waveforms) of these signals.

In this embodiment, whenever an H-level pulse of the synchronization signal SYNC is received, one radiation image is obtained by performing imaging once, thereby obtaining a plurality of still images, that is, performing so-called serial radiography.

Although not shown, the above-described control signals ADD1 and ADD2 are fixed to L level. That is, in this embodiment, when the control signal ADD0 is at H level, the sensor array 110 is set in the binning mode of collectively reading out the sensor signals (that is, the S1, S2, and N signals) of the plurality of sensors SE for every four sensors in 2 rows×2 columns. When the control signal ADD0 is at L level, the sensor array 110 is set in the normal mode.

The irradiation request signal EN_IRR is transmitted from the calculation unit 2 to the radiation source 3 by using the radiation source control unit 4. A change of the irradiation request signal EN_IRR from L level to H level indicates a request for the start of irradiation. A change of the irradiation request signal EN_IRR from H level to L level indicates a request for the termination of irradiation. That is, radiation is emitted while the irradiation request signal EN_IRR is at H level.

The state signal RO indicates whether to perform the operation of reading out signals from the sensor array 110. As will be described in detail later, signals are read out from the sensor array 110 while the state signal RO is at H level. That is, the sensor signals of the plurality of sensors SE are read out in the normal mode while the control signal ADD0 is at L level and the state signal RO is at H level, and read out in the binning mode while the control signal ADD0 is at H level and the state signal RO is at H level.

An outline of the method of driving the radiation imaging apparatus 1 according to this embodiment is as follows. First, initialization is performed after the radiation imaging apparatus 1 is activated, and reference data is prepared at times t100 to t104. At times t105 to t114 after that, one radiation image is obtained in response to the synchronization signal SYNC. More specifically, at times t105 to t109, image data (dark image data) is obtained in a non-irradiation state. At times t110 to t115 after that, image data (radiation image data) is obtained in an irradiation state. When reading out the radiation image data at times t110 to t115, the radiation image data is corrected based on the dark image data read out at times t105 to t109.

Details of this driving method will be described below.

First, at time t100, initialization is performed based on input information which is input by the user by using the input terminal 22. For example, the power supply voltage is supplied to each unit in the radiation imaging apparatus 1, thereby making the unit appropriately operable.

At time t101, the control signals EN, PRES, PCL, and WIDE change to H level. Consequently, the first portion PS1 and second portion PS2 of each sensor SE are reset. More specifically, the photoelectric converter PD and capacitors $C_{FD}$ and $C_{FD}'$ are reset, and the voltage VRES is supplied to them. Also, the node n2 is reset, and the voltage VCL is supplied to the node n2.

At time t102, the control signals TS1, TS2, TN, and ADD0 change to H level. Consequently, the sampling units $U_{SHS1}$, $U_{SHS2}$, and $U_{SHN}$ of the third portion PS3 are initialized in each sensor SE.

At time t103, the control signals EN, TS1, TS2, PRES, PCL, TN, and WIDE change to L level. When the control signals TS1, TS2, and TN change to L level, each of the sampling units $U_{SHS1}$, $U_{SHS2}$, and $U_{SHN}$ samples the initialized signal (that is, the signal when the second portion PS2 is reset). Also, when the control signals EN, PRES, PCL, and WIDE change to L level, the reset of the first portion PS1 and second portion PS2 is canceled.

In addition, the state signal RO changes to H level at time t103. Since the control signal ADD0 is maintained at H level at time t103, signal readout in the binning mode is started when the state signal RO changes to H level. Note that the method of this signal readout will be described in detail later.

At time t104, the state signal RO changes to L level because the abovementioned binning-mode signal readout is complete, and the control signal ADD0 changes to L level. The sensor signals (the S1, S2, and N signals) read out from the sensors SE in the binning mode at times t103 and t104 are processed as image data by the readout unit 12 and processing unit 13. At times t101 to t104, the irradiation request signal EN_IRR is maintained at L level, that is, no radiation is emitted. Therefore, the obtained image data practically has neither a light signal nor a signal component based on the detection of radiation. In this specification, the image data obtained in the non-irradiation state is expressed as "dark image data" for the sake of discrimination.

In summary, the dark image data is obtained in the binning mode at times t101 to t104. The obtained dark image data is indicated by "$D_0$" in FIG. 6. The data $D_0$ is held as reference data in the processing unit 13.

After time t104, at time t105 after the elapse of a relatively long time, the H-level pulse of the synchronization signal SYNC is given. In response to this pulse, dark image data is obtained in the binning mode at times t106 to t109 following the same procedures as at times t101 to t104. At time t108, the irradiation request signal EN_IRR changes to H level, and irradiation is started. In this state, each of the sampling units $U_{SHS1}$, $U_{SHS2}$, and $U_{SHN}$ of each sensor SE has completed sampling of the initialized signal. Therefore, the obtained image data is dark image data. The obtained dark image data is indicated by "$D_N$" in FIG. 6.

At time t110 after that, the control signals EN and TS1 change to H level. When the control signal EN changes to H level, the second portion PS2 amplifies a signal (a signal corresponding to radiation) from the first portion PS1, and outputs the amplified signal to the third portion PS3. Since the control signal WIDE is maintained at L level, that is, the sensor SE is in the high-sensitivity mode, the second portion PS2 amplifies a signal corresponding to the voltage of the capacitor $C_{FD}$ of the first portion PS1, and outputs the amplified signal to the third portion PS3. In addition, since the control signal TS1 changes to H level, the transistor M8 of the sampling unit $U_{SHS1}$ is turned on. Accordingly, the voltage (equivalent to the S1 signal) from the second portion PS2 is charged in the capacitor CS1.

At time t111, the irradiation request signal EN_IRR and control signal TS1 change to L level. When the irradiation request signal EN_IRR changes to L level, irradiation is terminated. When the control signal TS1 changes to L level, the sampling unit $U_{SHS1}$ holds (or fixes) the abovementioned voltage charged in the capacitor CS1, that is, samples the voltage as the S1 signal.

In addition, the control signals WIDE and TS2 change to H level at time t111. When the control signal WIDE changes to H level, the sensor SE is set in the low-sensitivity mode. More specifically, in the first portion PS1, the transistor M1 is turned on, and the capacitors $C_{FD}$ and $C_{FD}'$ are connected in parallel. Accordingly, a voltage corresponding to the combined capacitance of the capacitors $C_{FD}$ and $C_{FD}'$ is generated, and the second portion PS2 amplifies a signal corresponding to this voltage and outputs the amplified signal to the third portion PS3. Also, when the control signal TS2 changes to H level, the transistor $M_{11}$ of the sampling unit $U_{SHS2}$ is turned on. Consequently, the voltage (equivalent to the S2 signal) from the second portion PS2 is charged in the capacitor CS2.

At time t112, the control signal TS2 changes to L level, and the control signals PRES and PCL change to H level. When the control signal TS2 changes to L level, the sampling unit $U_{SHS2}$ holds the abovementioned voltage charged in the capacitor CS2, that is, samples the voltage as the S2 signal. Also, when the control signals PRES and PCL change to H level, the first portion PS1 and second portion PS2 are reset.

At time t113, the control signal TN changes to H level, and the control signals PRES and WIDE change to L level. When the control signal TN changes to H level, the transistor M14 of the sampling unit $U_{SHN}$ is turned on, and the voltage (equivalent to the N signal) from the abovementioned reset second portion PS2 is charged in the capacitor CN. Also, when the control signals PRES and WIDE change to L level, the reset of the first portion PS1 is canceled.

At time t114, the control signals TN and PCL change to L level. When the control signal TN changes to L level, the sampling unit $U_{SHN}$ holds the abovementioned voltage charged in the capacitor CN, that is, samples the voltage as the N signal. Also, when the control signal PCL changes to L level, the reset of the second portion PS2 is canceled.

In addition, the state signal RO changes to H level at time t114. At time t114, the control signal ADD0 is maintained at L level, so signal readout in the normal mode is started when the state signal RO changes to H level.

At time t115, the abovementioned signal readout in the normal mode is complete, so the state signal RO changes to L level. The sensor signals (the S1, S2, and N signals) read out from the sensor SE in the normal mode at times t114 and t115 are processed as image data by the readout unit 12 and processing unit 13. The obtained image data has a light signal or signal component based on the detection of radiation. In the following explanation, this image data obtained in the irradiation state will be expressed as "radiation image data" and discriminated from the above-described "dark image data" obtained in the non-irradiation state.

In summary, radiation image data is obtained in the normal mode at times t110 to t115. The obtained radiation image data is indicated by "$D_S$" in FIG. 6.

In the above explanation, the internal operation of a single sensor SE has been explained. However, this similarly applies to other sensors SE, so all the sensors SE in m rows×n columns forming the sensor array 110 can be controlled at once. For example, sampling of the S1 signal in the sampling unit $U_{SHS1}$ is performed in all the sensors SE at once (this similarly applies to sampling of the S2 and N signals).

Times t116 to t125 after that are the same as the contents of times t106 to t115 described above. That is, in response to the reception of the second H-level pulse of the synchronization signal SYNC, the dark image data $D_N$ is obtained in the binning mode at times t116 to t119, and the radiation image data $D_S$ is obtained in the normal mode at times t120 to t125. This similarly applies to cases in which the third and subsequent H-level pulses of the synchronization signal SYNC are received.

The mode of signal readout when the state signal RO changes to H level will be explained below with reference to FIGS. 7A and 7B.

Signal readout in the normal mode (signal readout at times t114 and t115) will be described below, but signal readout in the binning mode (signal readout at times t103 and t104 and times t108 and t109) can be regarded as the same.

Figure 7A:
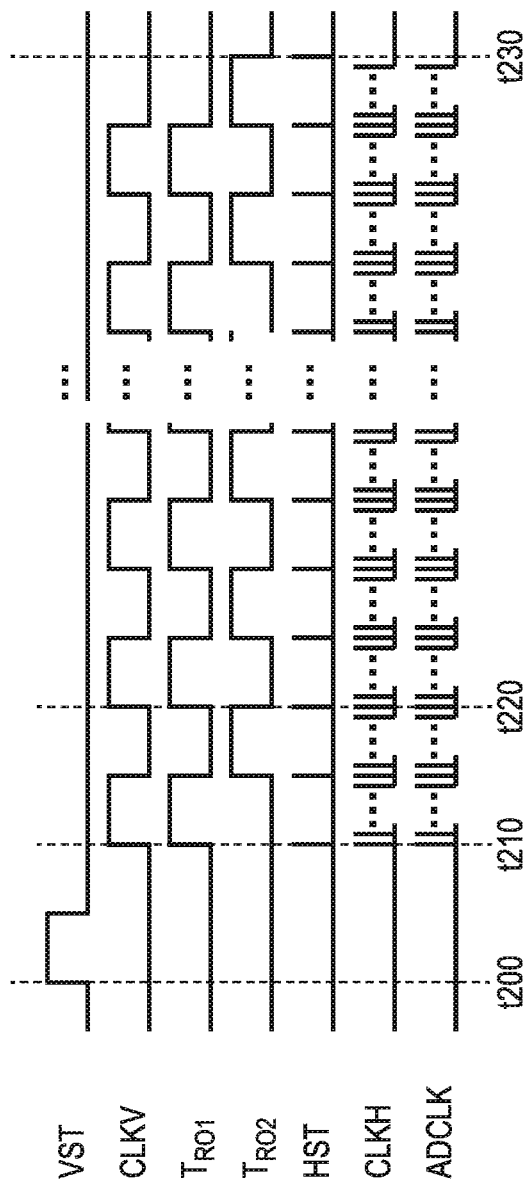
FIGS. 7A and 7B are timing charts for explaining a method of reading out a signal from each sensor.

FIG. 7A is a timing chart showing a method of driving the semiconductor chip DI and readout unit 12 when performing signal readout. The abscissa of FIG. 7A is the time axis. The ordinate shows the control signals VST, CLKV, $T_{RO1}$, $T_{RO2}$, HST, CLKH, and ADCLK (see FIGS. 2 and 5). FIG. 7A shows the signal levels of these signals.

An outline of the signal readout method is as follows. First, after the start pulse signal VST is received at time t200, H-level pulses are periodically given to the various control signals in a period until time t230. Consequently, the sensor signals (that is, the S1, S2, and N signals) are sequentially output from all the sensors SE in m rows×n columns, and read out by the readout unit 12.

The start pulse signal VST is a signal for resetting a row to be selected by the driving unit 111. Whenever the H-level pulse of the clock signal CLKV is received, a row to be selected shifts to the next row. For example, the first row is selected when the H-level pulse of the clock signal CLKV is given after the start pulse signal VST is received. After that, the second row, the third row, . . . , the mth row are sequentially selected whenever the H-level pulse of the clock signal CLKV is given.

The start pulse signal HST is a signal for resetting a column to be selected by the transfer unit 112. Whenever the H-level pulse of the clock signal CLKH is received, a column to be selected shifts to the next column. For example, the first column is selected when the H-level pulse of the clock signal CLKH is given after the start pulse signal HST is received. After that, the second column, the third column, . . . , the nth column are sequentially selected whenever the H-level pulse of the clock signal CLKH is given.

The frequency of the clock signal CLKH is higher than that of the clock signal CLKV. For example, while the ith row is selected by receiving the clock signal CLKV, the first to nth columns are selected by receiving the clock signal CLKH. After that, while the (i+1)th row is selected next by receiving the clock signal CLKV, the first to nth columns are similarly selected by receiving the clock signal CLKH.

The control signal $T_{RO1}$ which enables readout of the S1 signal by turning on the switch M50 shows H level/L level by the same period as that of the clock signal CLKV during the signal readout. The control signal $T_{RO2}$ which enables readout of the S2 signal by turning on the switch M51 shows a logic level opposite to that of the control signal $T_{RO1}$ during the signal readout.

For example, the S1 signals from the first to nth columns are sequentially read out while the ith row is selected. As described previously, the differential amplifier 121 obtains the differences between the readout S1 signals and corresponding N signals, and amplifies the differences. The converter 122 performs AD conversion on the S1 signals based on the clock signal ADCLK.

After the abovementioned S1 signals are read out, the S2 signals from the first to nth columns are sequentially read out. As described previously, the differential amplifier 121 obtains the differences between the readout S2 signals and corresponding N signals, and amplifies the differences. The converter 122 performs AD conversion on the S2 signals based on the clock signal ADCLK.

Figure 7B:
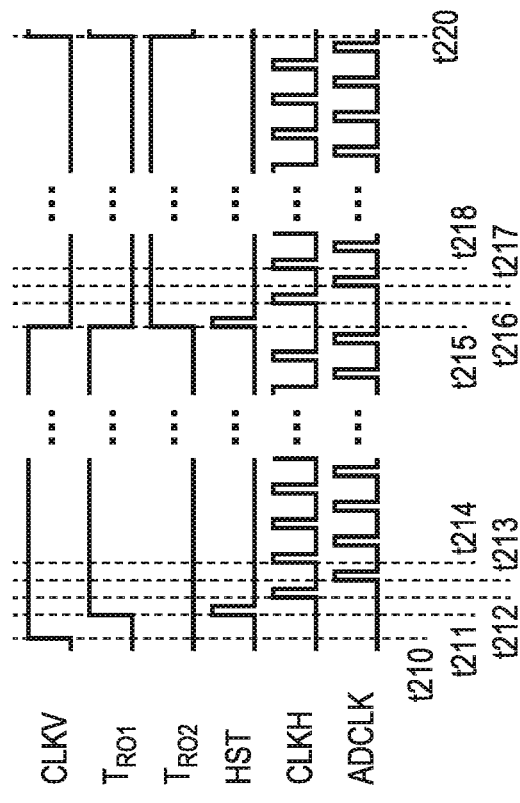

FIG. 7B is an enlarged view of the timing chart of one cycle (times t210 to t220) of the clock signal CLKV shown in FIG. 7A.

At time t210, the clock signal CLKV changes to H level (note that other signals are at L level). Consequently, the first row is selected. At time t211 after that, the control signal $T_{RO1}$ changes to H level, and the start pulse signal HST is given. Consequently, a column to be selected is reset.

At time t212, the H-level pulse of the clock signal CLKH is given. Consequently, the first column is selected. At time t213, the H-level pulse of the clock signal ADCLK is given. Accordingly, a digital signal corresponding to the difference between the S1 signal and N signal from the sensor SE in the first row and first column is generated.

At time t214, the H-level pulse of the clock signal CLKH is given. Consequently, the second column is selected. After that, a digital signal corresponding to the difference between the S1 signal and N signal from the sensor SE in the first row and second column is generated following the same procedures as above.

By repeating the above operation, digital signals corresponding to the S1 signals are sequentially generated for the first row and for the first to nth columns at times t212 to t215.

At times t215 to t218, the S2 signals are read out following the same procedures as those at times t211 to t214 in a state in which the control signal $T_{RO1}$ is at L level and the control signal $T_{RO2}$ is at H level. That is, at times t215 to t218, digital signals corresponding to the S2 signals are sequentially generated for the first row and for the first to nth columns.

In summary, when the state signal RO changes to H level in signal readout in the normal mode, digital signals corresponding to the S1 signals are read out by sequentially scanning the first to nth columns for the first row (times t211 to t215). After that, digital signals corresponding to the S2 signals are read out by sequentially scanning the first to nth columns for the first row (times t215 to t220). The same driving control is performed for the second and subsequent rows (times t220 to t230). The radiation image data $D_S$ is thus obtained.

Note that the processing unit 13 receives a plurality of radiation image data $D_S$ from the plurality of readout units 12, combines the plurality of data into single data, and outputs the data to the calculation unit 2. When displaying a radiation image on the display unit 21, the calculation unit 2 can use one or both of the S1 signal group and S2 signal group contained in the radiation image data $D_S$.

In the binning mode of this embodiment, the sensor signals are read out from every four sensors in 2 rows×2 columns. This makes it possible to selectively scan only one of an odd-numbered row group and even-numbered row group, and selectively scan only one of an odd-numbered column group and an even-numbered column group. Referring to FIG. 6 again, therefore, the time (times t103 and t104 and times t108 and t109) required for signal readout in the binning mode is practically about ¼ the time (times t114 and t115) required for signal readout in the normal mode.

When signals are read out at times t114 and t115, the corrector 123 (see FIG. 5) corrects these signals. This correction is performed based on the dark image data $D_N$ obtained in the binning mode at times t108 and t109. More specifically, the correction is performed by using correction data (or a parameter) corresponding to the difference between the dark image data $D_N$ and reference data. In this embodiment, the dark image data $D_0$ obtained in the binning mode at times t103 and t104 is used as this reference data.

Letting P be the abovementioned correction data, P can be calculated by, for example, the following equation.

$$P=\{(\Sigma SIG\_N)-(\Sigma SIG\_0)\}/(m\times n/4)$$

$\Sigma SIG\_N$: a total value of the signal values of digital signals forming the dark image data $D_N$
$\Sigma SIG\_0$: a total value of the signal values of digital signals forming the reference data $D_0$
m: the number of rows of the sensor array 110
n: the number of columns of the sensor array 110

Note that if the sensor SE not satisfying desired characteristics exists in the sensor array 110, a defective pixel exists in the dark image data $D_N$ or another image data. In this case, the correction data P can be calculated by excluding data from the defective pixel contained in the dark image data $D_N$. It is also possible to incidentally replace the data from the defective pixel with data from another pixel.

The abovementioned data P is set in the corrector 123, and a signal correction value equivalent to the data P is added to the signal (the S1 signal or S2 signal) read out from each sensor SE at times t114 and t115. In this embodiment, the signal correction value equivalent to the data P is generated by DA-converting the data P by the converter 1231 and amplifying the converted data P by the amplifier 1232.

This signal correction value is equivalent to the amount of variation in output value from the readout unit 12, which is caused by 1/f noise. 1/f noise is also called flicker noise, and is a noise component which is superimposed on a signal component to be originally output and varies with time. An example of the cause of 1/f noise is that the differential amplifier 121 and converter 122 in the readout unit 12 include a constant current source element, and trap and release of electric charge in this constant current source element occur in a relatively low period. Therefore, the output value from the readout unit 12 at a given timing and the output value from the readout unit 12 at another timing are sometimes different from each other even under the same conditions except the signal readout timings.

In the example of this embodiment, the output value from the readout unit 12 at times t103 and t104 under given imaging conditions and the output value from the readout unit 12 at times t108 and t109 under the same imaging conditions are different from each other, and the abovementioned signal correction value is equivalent to the difference between these output values. The adder 1233 adds this signal correction value to the signal (the S1 signal or S2 signal) read out from each sensor SE.

After time t109, the abovementioned data P is desirably calculated before time t114 at which signal readout for the radiation image data $D_S$ is started, preferably, between times t109 and t110. In this embodiment, the dark image data $D_N$ is obtained within a relatively short time by the binning mode, so the time required to calculate the data P can be shortened.

In this embodiment as described above, the sensor array 110 has, as operation modes, the normal mode in which the signals of the plurality of sensors SE are individually output, and the binning mode in which the signals of two or more sensors SE are collectively output. The readout unit 12 reads out the dark image data $D_N$ from the sensor array 110 in the binning mode. After that, the corrector 123 corrects the radiation image data $D_S$ read out from the sensor array 110 based on the dark image data $D_N$.

In this embodiment, the reference data $D_0$ is obtained in advance before reading out the dark image data $D_N$. For example, dark image data read out in the binning mode at times t101 to t104 is obtained as the reference data $D_0$. Then, when the readout unit 12 reads out the radiation image data $D_S$, the signal groups forming the data are corrected by adding the signal correction value corresponding to the difference between the dark image data $D_N$ and reference data $D_0$. In this embodiment, this signal correction value is equivalent to the fluctuation amount of the output value from the readout unit 12, which is caused by 1/f noise from the timing at which the reference data $D_0$ is obtained to the timing at which the dark image data $D_N$ is obtained.

In this embodiment, the mode in which one dark image data in the past is used as the reference data $D_0$ is taken as an example. However, the present invention is not limited to this example. For example, as another embodiment, the reference data $D_0$ may also be generated based on a plurality of dark image data in the past (for example, based on the result of averaging or weighted addition of the plurality of dark image data). In this case, the reference data $D_0$ may be updated every time new dark image data $D_N$ is obtained. Alternatively, as still another embodiment, it is also possible to perform predetermined evaluation (radiation image quality evaluation) on the radiation imaging apparatus 1 when manufacturing the radiation imaging apparatus 1, and determine the reference data $D_0$ based on the evaluation result.

In this embodiment, it is possible to correct the abovementioned output value variation of the readout unit 12, and obtain a radiation image having no quality variation regardless of the imaging timing. Note that in this embodiment, the mode in which the radiation image data $D_S$ is obtained in the normal mode is taken as an example. However, it is also possible to obtain the radiation image data $D_S$ in the binning mode, and perform the same correction in this case as well.

Furthermore, as described earlier with reference to FIG. 1, the radiation imaging apparatus 1 of this embodiment has the arrangement in which the plurality of semiconductor chips DI are arrayed and the plurality of readout units 12 corresponding to the semiconductor chips DI are arranged. If the above-described correction is not performed, therefore, different noise components are sometimes superimposed on the plurality of radiation image data $D_S$ obtained from the plurality of readout units 12. As a consequence, shading differences are sometimes produced between blocks in a radiation image displayed on the display unit 21. On the other hand, this embodiment can provide a radiation image easily observable by the user such as a doctor by performing the above-described correction, without producing any shading difference in the radiation image. Accordingly, this embodiment can improve the quality of a radiation image with a relatively simple arrangement.

Second Embodiment

The above-described first embodiment has been explained by taking, as an example, the mode in which digital signals corresponding to the S1 signals in the first to nth columns are read out for each row (at times t211 to t215), and digital signals corresponding to the S2 signals in the first to nth columns are read out for each row after that (at times t215 to t220). However, the signal readout method is not limited to this example. That is, even when performing signal readout by another method, the correction explained in the first embodiment can be performed, and the same effect as that of the first embodiment can be obtained.

As the second embodiment, a mode in which the sampling unit $U_{SHS1}$ of the third portion PS3 in each sensor SE samples both the S1 signal and S2 signal, that is, a mode in which the S1 signal and S2 signal are read out without using the sampling unit $U_{SHS2}$ will be explained.

Figure 8:
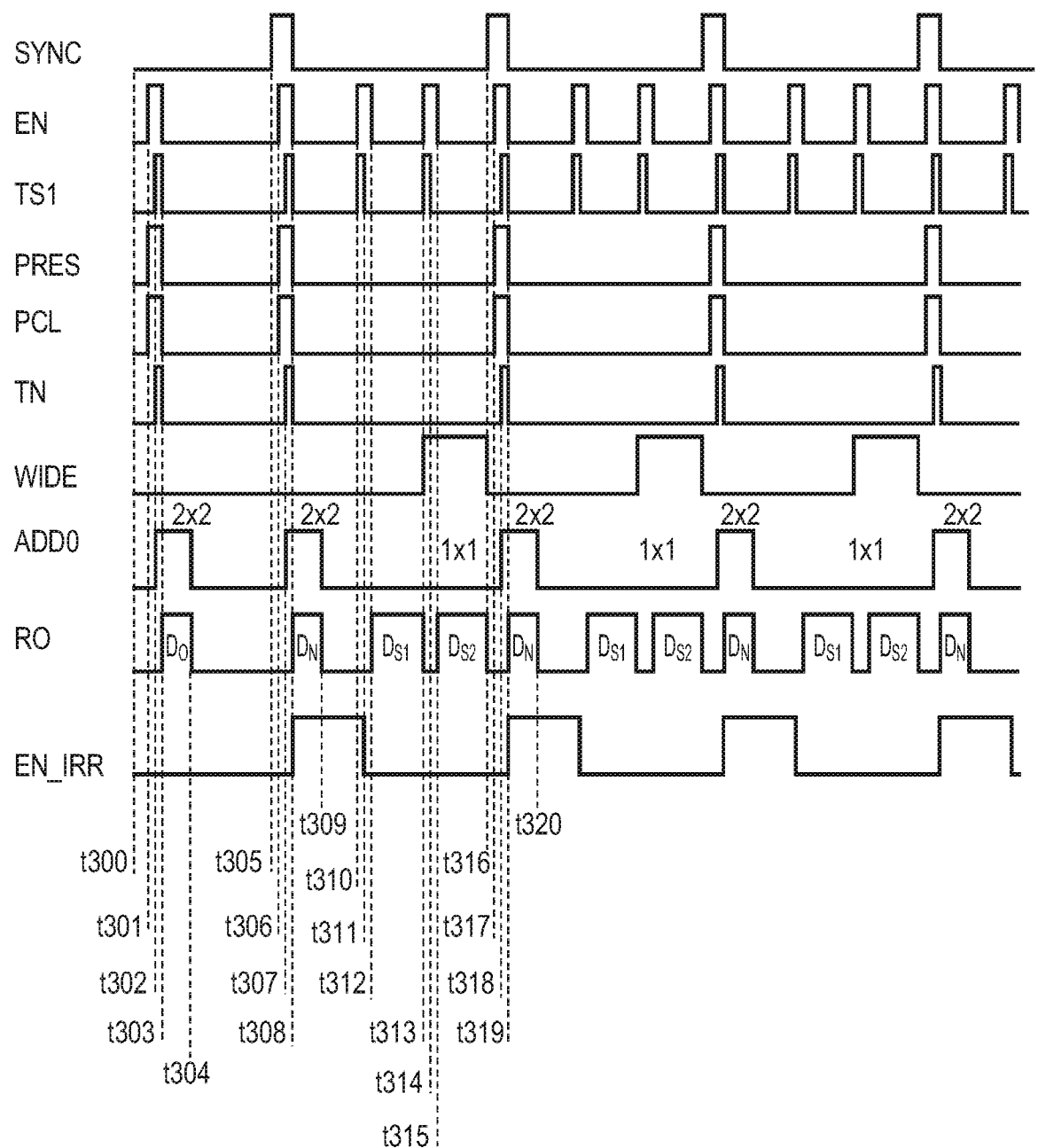
FIG. 8 is a timing chart for explaining a method of driving a radiation imaging apparatus.

FIG. 8 is a timing chart showing a method of driving a radiation imaging apparatus according to this embodiment, like FIG. 6 of the first embodiment. Since the sampling unit $U_{SHS2}$ is not used in this embodiment, FIG. 8 does not show the control signal TS2 (the control signal TS2 is fixed to L level).

The control contents of times t300 to t310 are the same as those of times t100 to t110 (see FIG. 6 of the first embodiment), so an explanation thereof will be omitted.

At times t310, t311, and t312, the same control as that at times t110, t111, and t114 is performed. Since the control signal WIDE is maintained at L level during this control, the sampling unit $U_{SHS1}$ samples the S1 signal in each sensor SE.

At times t312 and t313, the state signal RO changes to H level, and the S1 signal is read out from each of the plurality of sensors SE in the normal mode. Consequently, radiation image data ("$D_{S1}$" for the sake of discrimination) is obtained.

At time t313, the control signal WIDE changes to H level, that is, the sensor SE is set in the low-sensitivity mode. At times t313 to t315 after that, the same control as that at times t310 to t312 is performed, and the sampling unit $U_{SHS1}$ samples the S2 signal in each sensor SE.

At times t315 and t316, the state signal RO changes to H level, and the S2 signal is read out from each of the plurality of sensors SE in the normal mode. Consequently, radiation image data ("$D_{S2}$" for the sake of discrimination) is obtained.

The contents of times t316 to t320 after that are the same as those of times t305 to t309 described above. That is, in response to the reception of the second H-level pulse of the synchronization signal SYNC, the dark image data $D_N$ is obtained in the binning mode at times t316 to t320. After that, the radiation image data $D_{S1}$ and $D_{S2}$ are obtained in the normal mode following the same procedures as at times t312 and t313 and times t315 and t316, respectively. This similarly applies to cases in which the third and subsequent H-level pulses of the synchronization signal SYNC are received.

Note that in this embodiment, the sampling unit $U_{SHS2}$ is practically unnecessary, so the sampling unit $U_{SHS2}$ may also be deleted from (the third portion PS3 of) each sensor SE.

Note also that in this embodiment, the radiation image data $D_{S2}$ is obtained after the radiation image data $D_{S1}$ is obtained. Therefore, the mode of signal readout when the state signal RO changes to H level can be changed from that of the first embodiment (see FIGS. 7A and 7B). For example, the first to nth columns are first selected and scanned for each of the first to mth rows while the control signal $T_{RO1}$ is at H level and the control signal $T_{RO2}$ is at L level, thereby obtaining the radiation image data $D_{S1}$. After that, the first to nth columns are selected and scanned for each of the first to mth rows while the control signal $T_{RO1}$ is at L level and the control signal $T_{RO2}$ is at H level, thereby obtaining the radiation image data $D_{S2}$.

Third Embodiment

Figure 9:
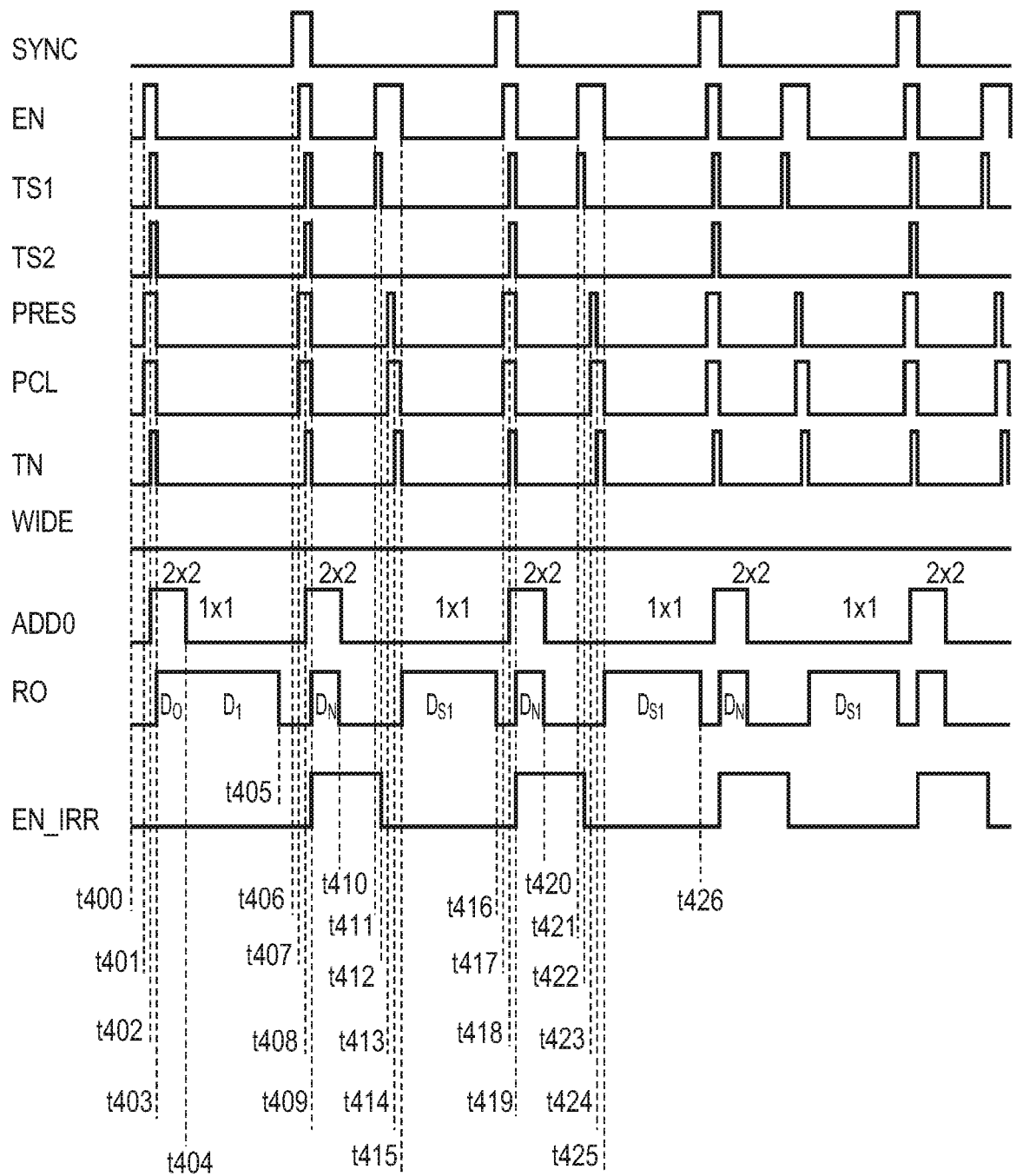
FIG. 9 is a timing chart for explaining a method of driving a radiation imaging apparatus.

FIG. 9 is a timing chart showing a method of driving a radiation imaging apparatus according to the third embodiment. This embodiment mainly differs from the above-described first embodiment in that after dark image data is obtained as the reference data $D_0$ in the binning mode (after times t403 and t404), dark image data is further obtained as correction image data $D_1$ in the normal mode (times t404 and t405). The correction image data $D_1$ contains a group of noise signals equivalent to a dark current component in each sensor SE, and is used to further correct the radiation image data $D_S$ obtained by each imaging. In this embodiment, it is possible to perform the correction explained in the first embodiment, and obtain the same effect as that of the first embodiment. In addition, this embodiment makes it possible to remove a noise component equivalent to the dark current component of each sensor SE from the radiation image data $D_S$.

Note that in this embodiment, the control signal WIDE is maintained at L level, and each sensor SE is fixed to the high-sensitivity mode.

The control contents of times t400 to t404 are the same as those of times t100 to t104 (see FIG. 6 of the first embodiment), so an explanation thereof will be omitted.

At times t403 and t404, dark image data is obtained as the reference data $D_0$ in the binning mode. At time t404 after that, the control signal ADD0 is changed to L level. At times t404 and t405 after that, dark image data is obtained as the correction image data $D_1$ in the normal mode.

At times t406 to t410, the dark image data $D_N$ is obtained in the binning mode. The control contents are the same as those of times t105 to t109, so an explanation thereof will be omitted.

At times t411 to t416, radiation image data is obtained in the normal mode. The control contents are the same as those of times t110 to t115, so an explanation thereof will be omitted. In this embodiment, the control signal WIDE is maintained at L level, and each sensor SE is fixedly set in the high-sensitivity mode. In this period, therefore, the control signal TS2 is maintained at L level, so sampling of the S2 signal is not performed. Accordingly, the obtained radiation image data is indicated by "$D_{S1}$" in FIG. 9.

The contents of times t417 to t426 after that are the same as those of times t407 to t416 described above. That is, in response to the reception of the second H-level pulse of the synchronization signal SYNC, the dark image data $D_N$ is obtained in the binning mode following the same procedures as above. After that, the radiation image data $D_{S1}$ is obtained in the normal mode. This similarly applies to cases in which the third and subsequent H-level pulses of the synchronization signal SYNC are received.

In this embodiment, it is possible to perform the same correction as that of the first embodiment, and obtain the same effect as that of the first embodiment. In addition, this embodiment makes it possible to remove a noise component equivalent to the dark current component of each sensor SE from the radiation image data $D_S$. This is advantageous in further improving the quality of a radiation image.

In this embodiment, the radiation image data $D_{S1}$ is obtained whereas the radiation image data $D_{S2}$ is not obtained. Therefore, the mode of signal readout when the state signal RO changes to H level can be changed from that of the first embodiment (see FIGS. 7A and 7B). For example, while the control signal $T_{RO1}$ is maintained at H level and the control signal $T_{RO2}$ is maintained at L level, the first to nth columns are selected and scanned for each of the first to mth rows, thereby obtaining the radiation image data $D_{S1}$.

(Others)

Although the several preferred embodiments have been explained above, the present invention is not limited to these examples, and a part of the invention may also be changed without departing from the spirit and scope of the invention. For example, the contents of a given embodiment can be combined with a part of the contents of another embodiment, and, in addition to this/instead of this, well-known elements can be added or deleted as necessary. Also, the terms described in this specification are merely used to explain the present invention, so the present invention is, of course, not limited to the strict meanings of these terms, and can contain their equivalents.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-170604, filed on Sep. 5, 2017, which is hereby incorporated by reference herein in its entirety.

What is claimed is:

1. A radiation imaging apparatus, comprising:
   a sensor array comprising a plurality of sensors in an array, said sensors being configured to detect radiation;
   a driving unit configured to drive the sensor array by scanning the plurality of sensors row-by-row; and
   a readout unit configured to read out sensor signals from the sensors of the sensor array driven by the driving unit, the readout unit including a converter configured to form image data by performing analog-to-digital conversion based on the sensor signals, the image data comprising first image data and second image data, wherein
   the readout unit further includes a correcting unit configured to correct the first image data based on the second image data,
   the first image data is formed based on a sensor signal read out from each of the plurality of sensors to the readout unit while the sensor array is irradiated with radiation in a first mode, and
   the second image data is formed based on a sensor signal read out to the readout unit by adding or averaging sensor signals of every two or more sensors among the plurality of sensors while the sensor array is not irradiated with radiation in a second mode, a scanning amount of the plurality of sensors in the second mode being less than a scanning amount of the plurality of sensors in the first mode.

2. The apparatus according to claim 1, wherein each of the plurality of sensors comprises:
   a detecting unit configured to detect radiation;
   an amplifying unit configured to amplify a signal from the detecting unit; and
   a sampling unit configured to sample the signal amplified by the amplifying unit as a first signal, and sample an output signal from the amplifying unit when the amplifying unit is reset as a second signal.

3. The apparatus according to claim 2, wherein
   in the sensor array, at least two sampling units corresponding to the two or more sensors are connected by a connecting portion including a switch such that said first signals and said second signals held in the at least two sampling units can be summed, and
   the driving unit drives the sensor array in the second mode so as to select and scan one of the two or more sensors while the connecting portion connects the at least two sampling units corresponding to the two or more sensors.

4. The apparatus according to claim 2, wherein the readout unit further includes a differential amplifier configured to amplify a difference between the first signal and the second signal, and
   the converter converts an output signal from the differential amplifier.

5. The apparatus according to claim 3, further comprising a processing unit configured to perform:
   a first operation of obtaining the second image data from the sensor array which is not irradiated with radiation;

a second operation of generating correction data based on the second image data obtained by the first operation and reference data; and a third operation of setting the correction data generated by the second operation in the correcting unit.

6. The apparatus according to claim 5, wherein in the second operation, the processing unit generates the correction data by excluding data from a defective pixel contained in the second image data obtained by the first operation.

7. The apparatus according to claim 5, further comprising:
a transfer unit configured to transfer, column by column, signals from the sensor array driven by the driving unit, wherein
the correcting unit includes an adder configured to add a signal corresponding to the correction data set by the third operation to each signal transferred by the transfer unit.

8. The apparatus according to claim 5, wherein the reference data is other second image data read out, before the first operation, from the sensor array which is not irradiated with radiation.

9. The apparatus according to claim 5, wherein the reference data is generated before the first operation based on a plurality of other second image data read out from the sensor array which is not irradiated with radiation.

10. The apparatus according to claim 1, wherein the sensor array is formed on a single semiconductor chip,
the apparatus further comprises a plurality of semiconductor chips arrayed on a substrate, and
the readout unit includes a plurality of readout units corresponding to the plurality of semiconductor chips.

11. A radiation imaging system, comprising:
the radiation imaging apparatus according to claim 1; and
a radiation source configured to generate radiation.

12. A method of driving a radiation imaging apparatus, comprising:
a sensor array comprising a plurality of sensors in an array, said sensors being configured to detect radiation;
a driving unit configured to drive the sensor array by scanning the plurality of sensors row-by-row; and
a readout unit configured to read out sensor signals from the sensors of the sensor array driven by the driving unit, the readout unit including a converter configured to form image data by performing analog-to-digital conversion based on the sensor signals, the image data comprising first image data and second image data, the method comprising the steps of:
forming the first image data based on a sensor signal read out from each of the plurality of sensors to the readout unit while the sensor array is irradiated with radiation in a first mode;
adding or averaging sensor signals of every two or more sensors among the plurality of sensors to form the second image data based on a sensor signal read out to the readout unit while the sensor array is not irradiated with radiation in a second mode, a scanning amount of the plurality of sensors in second mode being than a scanning amount of the plurality of sensors in the first mode; and
correcting the first image data based on the second image data.

* * * * *